United States Patent [19]

Onishi et al.

[11] Patent Number: 5,356,226
[45] Date of Patent: Oct. 18, 1994

[54] BEARING DEVICE

[75] Inventors: Masayoshi Onishi, Sakai; Takeshi Takahashi, Yamatotakada, both of Japan

[73] Assignee: Koyo Seiko Co., Ltd., Osaka, Japan

[21] Appl. No.: 44,008

[22] Filed: Apr. 8, 1993

Related U.S. Application Data

[62] Division of Ser. No. 873,000, Apr. 24, 1992, abandoned.

[30] Foreign Application Priority Data

Apr. 26, 1991 [JP] Japan .............................. 3-029584[U]
Apr. 26, 1991 [JP] Japan .............................. 3-029585[U]

[51] Int. Cl.⁵ ............................................. F16C 25/04
[52] U.S. Cl. ..................................... 384/119; 384/220
[58] Field of Search ............... 384/119, 114, 100, 115, 384/107, 120, 117, 220

[56] References Cited

U.S. PATENT DOCUMENTS

| | | |
|---|---|---|
| 1,550,265 | 8/1925 | Knippel . |
| 3,414,340 | 12/1968 | Heath . |
| 3,467,449 | 9/1969 | Muijderman . |
| 3,522,976 | 8/1970 | Spyra . |
| 4,797,009 | 1/1989 | Yamazaki . |
| 4,798,480 | 1/1989 | Van Beek .................. 384/114 |
| 4,820,950 | 4/1989 | Hijiya et al. . |
| 4,986,675 | 1/1991 | Dye et al. . |
| 5,054,938 | 10/1991 | Ide .......................... 384/119 |
| 5,066,144 | 11/1991 | Ide .......................... j384/119 |

FOREIGN PATENT DOCUMENTS

| | | |
|---|---|---|
| 826807 | 1/1952 | Fed. Rep. of Germany . |
| 4010564 | 12/1990 | Fed. Rep. of Germany . |
| 1407153 | 6/1965 | France . |
| 1546285 | 10/1968 | France . |
| 2140759 | 1/1973 | France . |
| 2235736 | 3/1991 | United Kingdom . |

*Primary Examiner*—Lenard A. Footland
*Attorney, Agent, or Firm*—Wenderoth, Lind & Ponack

[57] ABSTRACT

Bearing sleeves of dynamic pressure bearings are adjustably supported on mounting sleeves by flexible connecting portions. The center axes of the bearing sleeves are thus finely adjusted so as to coincide with the center axis of the shaft 3. The concentricity of the bearing sleeves with respect to the shaft 3 can then be enhanced without requiring any high-precision machining.

4 Claims, 4 Drawing Sheets

BEARING DEVICE

This is a Divisional application of Ser. No. 07/873,000, filed Apr. 24, 1992, now abandoned.

BACKGROUND OF THE INVENTION

1. Field of the Invention

The present invention relates to bearing devices such as dynamic pressure bearings and slide bearings.

2. Description of the Prior Art

In bearing devices such as a dynamic pressure bearings and the like, having a plurality of bearing portions, their bearing performance significantly depends on the concentricity between inner and outer diameters of each bearing portion as well as on the alignment of the plurality of bearing portions. If any misalignment takes place in setting up the bearing portions, the resulting performance would be quite low. Accordingly, to attain successful bearing performance, the machining of the bearing portions must be carried out at very high precision, which may cause a problem of increased prices of the bearing devices.

This being the case, there has been provided a dynamic pressure bearing as shown in FIG. 5, intended to solve the foregoing problem. To provide this dynamic pressure bearing, a plurality of bearing portions 32 and 35 are integrally molded with a sleeve 31, so that the concentricity and alignment of the plurality of bearing portions 32 and 35 can readily be ensured. The dynamic pressure bearing mentioned above, having a very small clearance between the bearing portions 32 and 35 and a shaft (not shown) fitted thereto, is required to suppress the friction torque of grease between the sleeve 31 and the shaft. To do this, there is provided a concave portion 33 in the center of the inner periphery of the sleeve 31 at a portion other than the bearing portions 32 and 35, thereby giving a larger clearance between the concave portion 33 and the shaft. However, the process of forming the concave portion 33 in the center portion of the inner periphery of the sleeve 31 is difficult. Another difficulty arises in washing the concave portion 33.

SUMMARY OF THE INVENTION

The object of the present invention is therefore to provide a bearing device capable of successfully ensuring the concentricity and alignment of its bearing portions without requiring any high-precision machining, or any difficult processing or washing.

In order to achieve the aforementioned object, according to the present invention, there is provided a bearing device which comprises a bearing sleeve for bearing a shaft, a mounting sleeve to be disposed outside the bearing sleeve, and a support member for adjustably supporting the bearing sleeve to the mounting sleeve.

Preferably, in the bearing device of the invention, the support member is an appropriately flexible connecting portion for integrally connecting an outer, peripheral, axially approximately center portion of the bearing sleeve with an inner, peripheral, axially approximately center portion of the mounting sleeve.

Also preferably, in the bearing device of the invention, a dynamic pressure generating groove is provided on the inner periphery of the bearing sleeve.

With the above-described arrangement, the connecting portion, which integrally connects the outer, peripheral, axially approximately center portion of the bearing sleeve with the inner, peripheral, axially approximately center portion of the mounting sleeve disposed outside the bearing sleeve, adjustably supports the bearing sleeve, which supports the shaft, on the mounting sleeve. As a result, the bearing sleeve can be successfully made concentric and aligned with respect to the shaft by the connecting portion without requiring any high-precision machining or difficult processing.

Also, when the dynamic pressure generating groove is provided on the inner periphery of the bearing sleeve, the concentricity and alignment can be easily ensured without requiring any high-precision machining or difficult processing, especially for dynamic pressure bearings having a small clearance.

Still further, preferably, in the bearing device of the invention, the bearing sleeve and the mounting sleeve are formed discrete from each other, and the support member is formed integrally with the mounting sleeve.

With the above described arrangement, the bearing sleeve for bearing the shaft is adjustably supported by the support member provided on the mounting sleeve disposed outside the bearing sleeve. As a result, the bearing sleeve can be ensured a good concentricity and alignment with respect to the shaft by the support member without requiring any high-precision machining or difficult processing.

BRIEF DESCRIPTION OF THE DRAWINGS

The present invention will become more fully understood from the detailed description given hereinbelow and the accompanying drawings, which are presented by way of illustration only, and thus are not limitative of the present invention, and wherein:

FIG. 1 (B) is a sectional view of the aforementioned bearing device;

FIG. 3 (B) is a transverse sectional view of the bearing device of FIG. 3A;

FIG. 3 (C) is a transverse sectional view of a variation of the bearing device of FIG. 3A;

DETAILED DESCRIPTION OF THE PREFERRED EMBODIMENTS

First Embodiment

Figure 1:
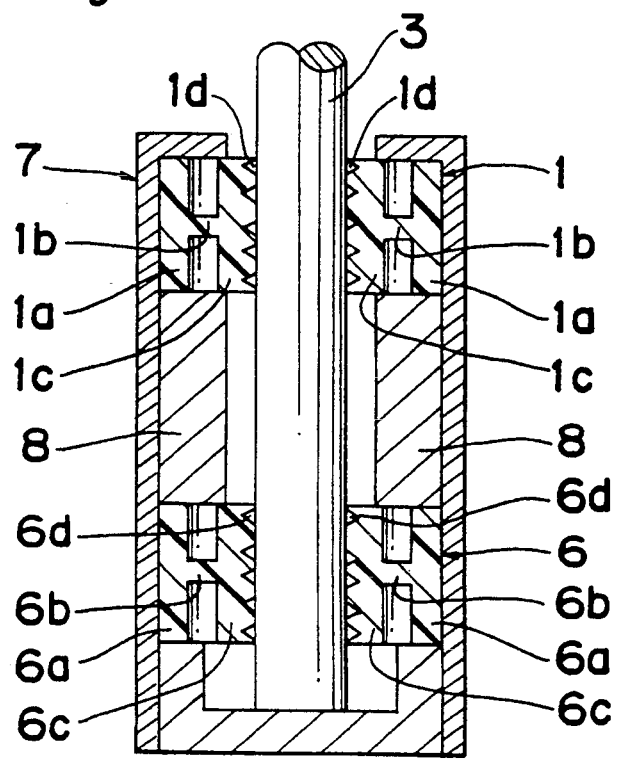
FIG. 1 (A) is a sectional view of a device according to a first embodiment of a bearing device of the present invention.
Figure 1:
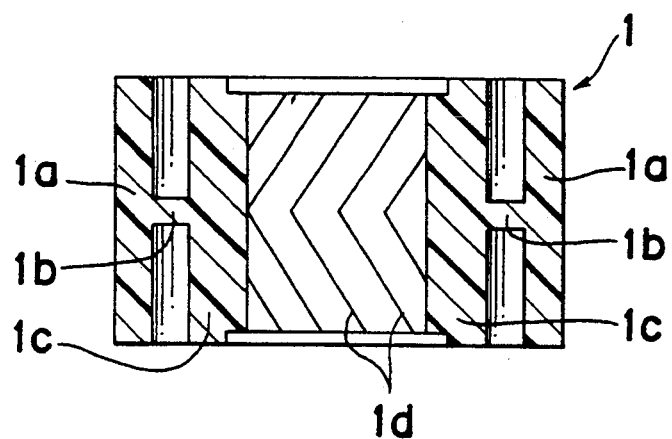

FIG. 1 (A) is a longitudinal sectional view of a device according to a first embodiment in which dynamic pressure bearings 1 and 6 and a spacer 8 are press fitted into a cylindrical casing 7. The dynamic pressure bearings 1 and 6 are formed of a resin having appropriate elasticity, such as polytetrafhoreoethylene (hereinafter referred to as PTFE), and are identical to each other in their construction. The dynamic pressure bearing 1 is provided with a bearing sleeve 1c having dynamic pressure grooves 1d on its inner periphery. The dynamic pressure bearing 6 is equipped with a bearing sleeve 6c having dynamic pressure grooves 6d on its inner periphery. The bearing sleeves 1c and 6c are used to support a shaft 3.

Figure 2A:
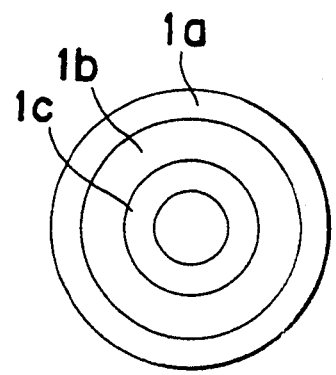
FIGS. 2 (A), (B), and (C) are views of bearing devices of the invention viewed from top.
Figure 2B:
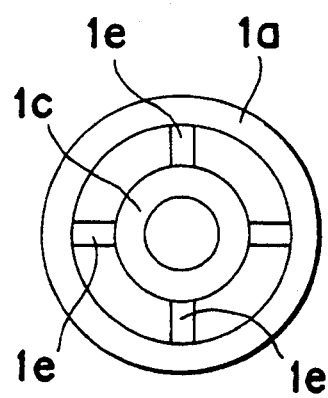
Figure 2C:
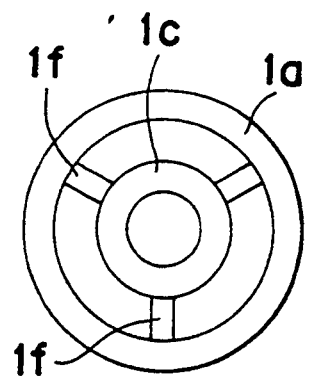

FIG. 1 (B) is a longitudinal sectional view of the above-described dynamic pressure bearing 1. FIG. 2 (A) is a view of the dynamic pressure bearing 1 as viewed from top.

On the outside of the bearing sleeve 1c of the dynamic pressure bearing 1 there is provided a mounting sleeve 1a, and it is arranged so that a thin flexible ring-shaped connecting portion 1b is a support member, integrally couples the entire circumference of the outer peripheral, axially approximately center, portion of the bearing sleeve 1c with the entire circumference of the inner peripheral, axially approximately center, portion of the mounting sleeve 1a, and adjustably supports the bearing sleeve 1c to the mounting sleeve 1a. On the outside of the bearing sleeve 6c of the dynamic pressure bearing 6, as shown in FIG. 1 (A), there is disposed a mounting sleeve 6a, and it is arranged so that a thin flexible ring-shaped connecting portion 6b, integrally couples the entire circumference of the outer peripheral, axially approximately center, portion of the bearing sleeve 6c with the entire circumference of the inner peripheral, axially approximately center, portion of the mounting sleeve 6a, and adjustably supports the bearing sleeve 6c on the mounting sleeve 6a adjustably.

Since the bearing sleeves 1c and 6c of the dynamic pressure bearings 1 and 6 are adjustably supported by the flexible connecting portions 1b and 6b, the center axes of the bearing sleeves 1c and 6c are finely adjusted so as to coincide with the center, axis of the shaft 3. As a result, the concentricity of the bearing sleeves 1c and 6c with respect to the shaft 3, as well as the alignment of the bearing sleeves 1c and 6c, can be successfully ensured.

Also, the dynamic pressure bearings 1 and 6 are provided discretely from the casing 7, and the inner periphery of the casing 7 is not a bearing surface for directly supporting the shaft 3. It is then allowable to roughly process the inner periphery of the casing 7, and thus the inner periphery of the casing 7 is easy to machine. Because the dynamic pressure bearings 1 and 6 and the spacer 8 are detachably fitted in the cylindrical casing 7, it is easy to wash them. Further, because the spacer 8 is provided discretely from the dynamic pressure bearings 1 and 6 and the cylindrical casing 7 accommodates the dynamic pressure bearings 1 and 6 and the spacer 8, it is easy to machine and arrange the dynamic pressure bearings 1 and 6, the spacer 8 and the inner periphery of the casing 7. The clearance between the spacer 8 and the shaft 3 resulting when the spacer 8 is press fitted to the center portion of the inner periphery of the casing 7, which will generate no dynamic pressure, becomes large as compared with an extremely narrow clearance between the dynamic pressure sleeves 1d and 6d, which will generate dynamic pressure, and the shaft 3. This allows the friction torque between the casing 7 and the shaft 3 to be easily reduced without requiring any difficult machining.

In the dynamic pressure bearing 1 of the present embodiment, between the bearing sleeve 1c and the mounting sleeve 1a there was provided a connecting portion 1b continuing in the circumferential direction, as shown in FIG. 2 (A). However, the connecting portion of the dynamic pressure bearing 1 may be provided in the form of flexible spokes radially extending at four or three circumferential points between the mounting sleeve 1a and the bearing sleeve 1c, such as connecting portions 1e or 1f shown in FIG. 2 (B) or (C). The spoke-shaped connecting portion may also be provided at two points in the circumferential direction. Further, although the bearing device was a dynamic pressure bearing in this embodiment, the present invention can be applied to slide bearings.

As is apparent from the above description, the bearing device according to the first embodiment is so arranged that the connecting portion for integrally connecting the bearing sleeve and the mounting sleeve outside thereof adjustably supports the bearing sleeve, which supports the shaft, on the mounting sleeve. As a result, the bearing sleeve can be aligned so that its center axis will coincide with the center axis of the shaft, thus giving a successful concentricity and alignment with respect to the shaft without the need for subjecting the bearing sleeve to any high-precision machining.

Further, when a dynamic pressure generating groove is provided on the inner periphery of the bearing sleeve, high-precision machining of the dynamic pressure bearing as has conventionally been needed for attaining an accurate concentricity and alignment can be eliminated, thus allowing a good concentricity and alignment of the dynamic pressure bearing with respect to the shaft to be simply attained.

Second Embodiment

Figure 3:
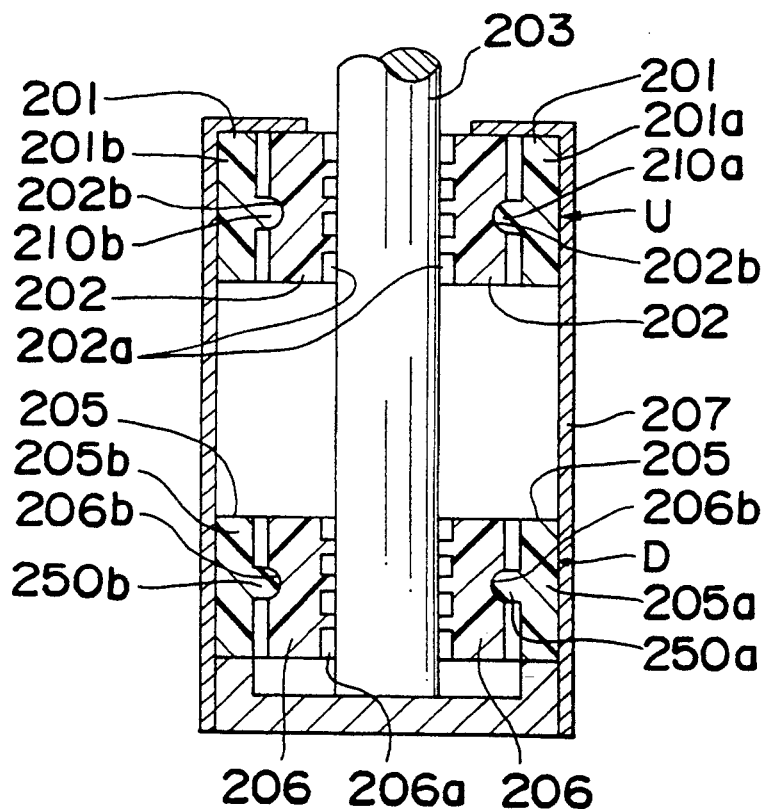
FIG. 3 (A) is a sectional view of a device according to a second embodiment of the bearing device of the invention.
Figure 3B:
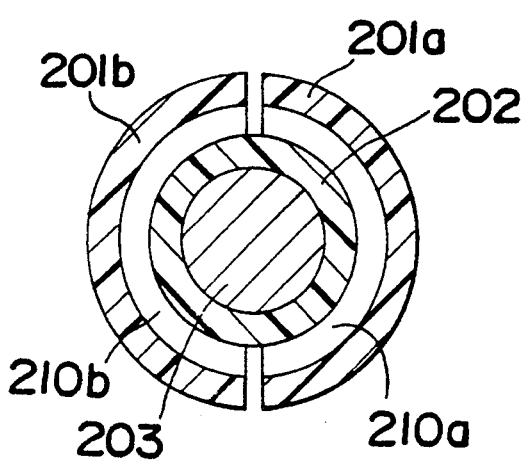
Figure 3C:
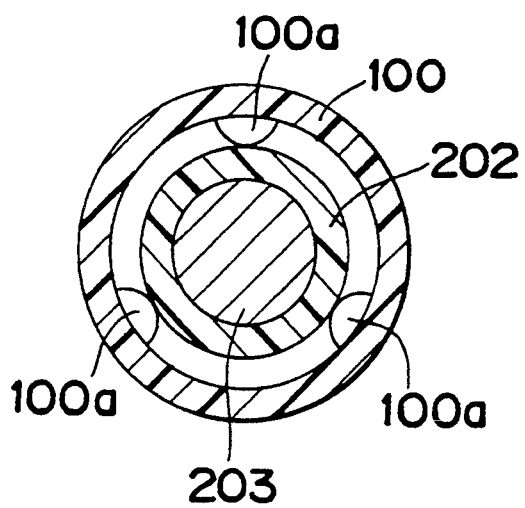

FIG. 3 (A) is a longitudinal sectional view of a bearing device according to a second embodiment of the present invention, wherein dynamic pressure bearings U and D are press fitted into a casing 207. The dynamic pressure bearings U and D are of absolutely the same construction. The dynamic pressure bearings U and D are equipped with a bearing sleeve 202 having dynamic pressure grooves 202a on its inner periphery and a bearing sleeve 206 having dynamic pressure grooves 206a on its inner periphery, so that the dynamic pressure bearings support a shaft 203. A resin material good in wear resistance and low in friction, such as fluororesin, for example, is used as the material for the bearing sleeves 202 and 206, thereby offering a long service life of the bearing sleeves 202 and 206.

Figure 4:
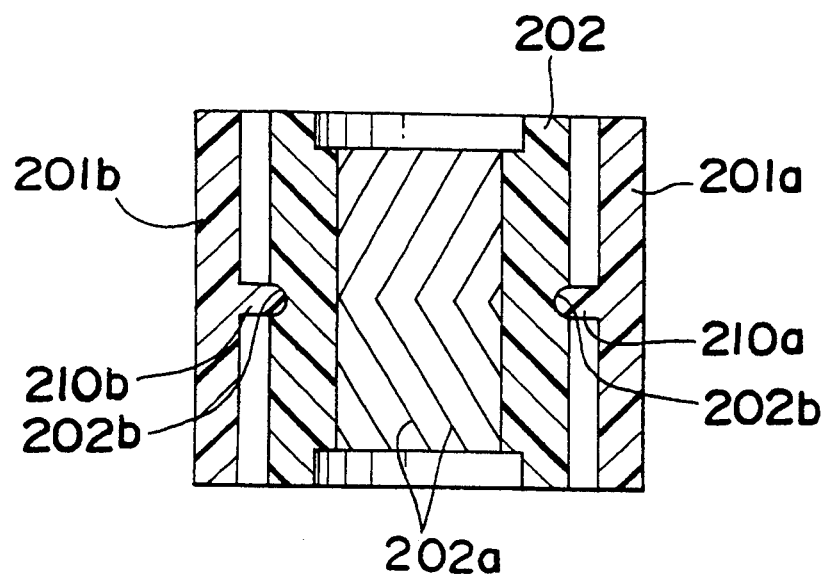
FIG. 4 is a longitudinal sectional view of the bearing device of FIG. 3A.
Figure 5:
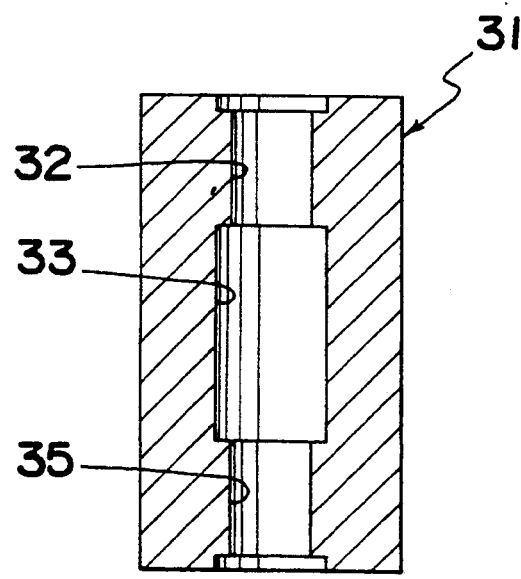
FIG. 5 is a sectional view of a conventional bearing device.

FIG. 3 (B) shows a transverse section of the dynamic pressure bearing U. FIG. 4 shows a longitudinal section of the dynamic pressure bearing U. Outside the bearing sleeve 202 of the dynamic pressure bearing U there is disposed a mounting sleeve 201 made up of two semi-cylindrical components 201a and 201b. To the inner periphery of the mounting sleeve 201 there are formed adjusting flanges 210a and 210b as support members, which are fitted to grooves 202b formed on the outer periphery of the bearing sleeve 202 to adjustably support the bearing sleeve 202. Also, outside the bearing sleeve 206, as shown in FIG. 3 (A), there is disposed a mounting sleeve 205 made up of two semi-cylindrical components 205a and 205b. To the inner periphery of the mounting sleeve 205 there is formed adjusting flanges 250a and 250b, which are fitted to a groove 206b formed on the outer periphery of the bearing sleeve 206 to adjustably support the bearing sleeve 206. An appropriately hard resin material such as PTFE is used as the material for the mounting sleeves 201 and 205, so that an optimum alignment can be attained. The mounting sleeves 201 and 205 are fixed inside the casing 7.

Since the bearing sleeves 202 and 206 of the dynamic pressure bearings U and D are alignably supported by the mounting sleeves 201 and 205 having adjusting flanges 210a and 210b, and 205a and 250b, thus the center axes of the bearing sleeves 202 and 206 can be finely adjusted so that they coincide with the center axis of the shaft 203. As a result, the concentricity of the bearing sleeves 202 and 206 with respect to the shaft 203, as well as the alignment of the bearing sleeves 202 and 206, can be successfully ensured without requiring any high-precision machining.

Also, since the mounting sleeves 201 and 205 and the bearing sleeves 202 and 206 are provided separately from the casing 207, and the inner periphery of the casing 207 does not directly support the shaft 203, it is unnecessary to subject the inner periphery of the casing 207 to fine machining, thus making the casing 207 easy to machine. Also, it is easy to machine the dynamic pressure bearings 201 and 206 and the casing 207 so that the clearance between the inner peripheral center portion of the casing 207, which will generate no dynamic pressure, and the shaft 3, becomes large as compared with an extremely narrow clearance between the bearing sleeves 202 and 206, which will generate dynamic pressure, and the shaft 3, because they are formed separately. This allows the friction torque between the casing 207 and the shaft 203 to be easily reduced without requiring any difficult machining.

In the dynamic pressure bearings U and D of the present embodiment, the mounting sleeves 201 and 205 were each made up of two semi-cylindrical components. However, it may also be arranged that the mounting sleeve is provided by a single cylindrical component 100, as shown in FIG. 3 (C), and three adjusting protrusions 100a as support members are provided on the inner periphery of the component 100 at regular intervals in the circumferential direction. Also, although not shown, a spacer may be disposed between the mounting sleeves 201 and 205. Further, although in the present embodiment the bearing device was a dynamic pressure bearing, the present invention can be applied to slide bearings.

As is apparent from the above description, the bearing device according to the second embodiment of the invention is so arranged that the support members provided on the mounting sleeves disposed outside the bearing sleeves adjustably support the bearing sleeves, which support the shaft. As a result, the bearing sleeves are aligned so that their axes coincide with the center axis of the shaft, thus allowing a good concentricity and alignment with respect to the shaft to be attained successfully without subjecting the bearing sleeves to any high precision machining.

Furthermore, when a dynamic pressure generating groove is provided on the inner periphery of the bearing sleeves, high-precision machining of the dynamic pressure bearings, as has conventionally been needed, especially for obtaining a highly accurate concentricity and alignment because of an extremely small clearance, can be eliminated, thus allowing the concentricity and alignment of the dynamic pressure bearings with respect to the shaft to be easily obtained at a high accuracy.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bearing device, comprising:
   a bearing sleeve for bearing a shaft;
   a mounting sleeve disposed outside said bearing sleeve; and
   a support member for adjustably supporting said bearing sleeve on said mounting sleeve, said bearing sleeve and said mounting sleeve being discrete from each other, and said support member being formed integrally with said mounting sleeve;
   wherein said mounting sleeve comprises two semi-cylindrical components, said support member comprises an adjusting flange on the inner periphery of each said semi-cylindrical component thereof, and an annular groove is on the outer periphery of said bearing sleeve, said adjusting flanges being fitted into said annular groove.

2. The bearing device of claim 1, wherein a dynamic pressure generating groove is provided on the inner periphery of said bearing sleeve.

3. The bearing device of claim 1, wherein said bearing sleeve is composed of a first material and said mounting sleeve is composed of a second material, said second material being polytetrafluorethylene.

4. The bearing device of claim 3, wherein said first material is fluororesin.

* * * * *